US007150321B2

(12) United States Patent
Luke et al.

(10) Patent No.: US 7,150,321 B2
(45) Date of Patent: Dec. 19, 2006

(54) ZEOLITE-CONTAINING SETTABLE SPOTTING FLUIDS

(75) Inventors: Karen Luke, Duncan, OK (US); Russell M. Fitzgerald, Velma, OK (US); Frank Zamora, Duncan, OK (US); Ashok K. Santra, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 81 days.

(21) Appl. No.: 10/738,199

(22) Filed: Dec. 17, 2003

(65) Prior Publication Data

US 2004/0188091 A1    Sep. 30, 2004

Related U.S. Application Data

(63) Continuation-in-part of application No. 10/727,370, filed on Dec. 4, 2003, which is a continuation-in-part of application No. 10/686,098, filed on Oct. 15, 2003, now Pat. No. 6,964,302, which is a continuation-in-part of application No. 10/623,443, filed on Jul. 18, 2003, which is a continuation-in-part of application No. 10/315,415, filed on Dec. 10, 2002, now Pat. No. 6,989,057.

(51) Int. Cl.
*E21B 33/16* (2006.01)
*E21B 33/138* (2006.01)
*C09K 7/02* (2006.01)
*C09K 7/06* (2006.01)

(52) U.S. Cl. .................. 166/291; 166/292; 166/300; 175/64; 175/72; 507/269; 507/277; 507/925

(58) Field of Classification Search ............... 166/291, 166/292, 300; 175/64, 72; 507/140, 145, 507/269, 277, 906, 910, 925
See application file for complete search history.

(56) References Cited

U.S. PATENT DOCUMENTS

| | | |
|---|---|---|
| 1,943,584 A | 1/1934 | Cross .......................... 252/6 |
| 2,094,316 A | 9/1937 | Cross |
| 2,131,338 A | 9/1938 | Vail |
| 2,349,049 A | 5/1944 | Means |
| 2,727,001 A | 12/1955 | Rowe |
| 2,848,051 A | 8/1958 | Williams |
| 3,047,493 A | 7/1962 | Rosenberg |
| 3,065,170 A | 11/1962 | Dumbauld et al. |
| 3,293,040 A | 12/1966 | Shaler, Jr. et al. |
| 3,359,225 A | 12/1967 | Weisand ................... 260/29.6 |
| 3,694,152 A | 9/1972 | Sersale et al. ............ 423/329 |
| 3,781,225 A | 12/1973 | Schwartz |
| 3,884,302 A | 5/1975 | Messenger |
| 3,887,385 A | 6/1975 | Quist et al. ................ 106/96 |
| 3,888,998 A | 6/1975 | Sampson et al. |
| 3,963,508 A | 6/1976 | Masaryk |
| 4,054,462 A | 10/1977 | Stude |
| 4,141,843 A | 2/1979 | Watson |
| 4,217,229 A | 8/1980 | Watson |
| 4,311,607 A | 1/1982 | Kaeser |
| 4,363,736 A * | 12/1982 | Block ........................ 507/114 |
| 4,368,134 A | 1/1983 | Kaeser |
| 4,372,876 A | 2/1983 | Kulprathipanja et al. |
| 4,435,216 A | 3/1984 | Diehl et al. ................... 106/97 |
| 4,444,668 A | 4/1984 | Walker et al. |
| 4,468,334 A | 8/1984 | Cox et al. |
| 4,474,667 A * | 10/1984 | Block ........................ 507/114 |
| 4,482,379 A | 11/1984 | Dibrell et al. ............... 106/76 |
| 4,515,216 A | 5/1985 | Childs et al. ............... 166/293 |
| 4,515,635 A | 5/1985 | Rao et al. ..................... 106/90 |
| 4,530,402 A | 7/1985 | Smith et al. ................ 166/291 |
| 4,536,297 A | 8/1985 | Loftin et al. |
| 4,548,734 A | 10/1985 | Chaux et al. |
| 4,552,591 A | 11/1985 | Millar |
| 4,555,269 A | 11/1985 | Rao et al. ..................... 106/90 |
| 4,557,763 A | 12/1985 | George et al. ................ 106/90 |
| 4,632,186 A | 12/1986 | Boncan et al. |
| 4,650,593 A | 3/1987 | Slingerland |
| 4,676,317 A | 6/1987 | Fry et al. ..................... 166/293 |
| 4,703,801 A | 11/1987 | Fry et al. ..................... 166/293 |
| 4,717,488 A | 1/1988 | Seheult et al. |
| 4,772,307 A | 9/1988 | Kiss et al. |
| 4,784,693 A | 11/1988 | Kirkland et al. |
| 4,818,288 A | 4/1989 | Aignesberger et al. ....... 106/90 |
| 4,888,120 A | 12/1989 | Mueller et al. |
| 4,986,989 A | 1/1991 | Sirosita et al. |
| 5,121,795 A | 6/1992 | Ewert et al. ................. 166/292 |
| 5,123,487 A | 6/1992 | Harris et al. ................. 166/277 |
| 5,125,455 A | 6/1992 | Harris et al. ................. 166/292 |
| 5,127,473 A | 7/1992 | Harris et al. ................. 166/277 |
| 5,151,131 A | 9/1992 | Burkhalter et al. ......... 106/822 |
| 5,238,064 A | 8/1993 | Dahl et al. .................. 166/293 |

(Continued)

FOREIGN PATENT DOCUMENTS

CA    2153372    1/1996

(Continued)

OTHER PUBLICATIONS

SPE 20624 entitled "Acidization of Analcime-Cementing Sandstone, Gulf Of Mexico", by D.R. Underdown et al., dated 1990.

(Continued)

*Primary Examiner*—George Suchfield
(74) *Attorney, Agent, or Firm*—Craig W. Roddy; Haynes & Boone, LLP

(57) ABSTRACT

Methods and compositions for wellbore treating fluids, especially settable spotting fluids, that include zeolite and at least one carrier fluid.

42 Claims, No Drawings

U.S. PATENT DOCUMENTS

| | | | |
|---|---|---|---|
| 5,252,554 A | 10/1993 | Mueller et al. | 507/138 |
| 5,340,860 A | 8/1994 | Brake et al. | 524/166 |
| 5,346,012 A | 9/1994 | Heathman et al. | 166/293 |
| 5,383,967 A | 1/1995 | Chase | 106/737 |
| 5,435,846 A | 7/1995 | Tatematsu et al. | 106/813 |
| 5,494,513 A | 2/1996 | Fu et al. | 106/672 |
| 5,529,624 A | 6/1996 | Riegler | 106/675 |
| 5,588,489 A | 12/1996 | Chatterji et al. | |
| 5,626,665 A | 5/1997 | Barger et al. | 106/706 |
| 5,680,900 A | 10/1997 | Nguyen et al. | 166/295 |
| 5,711,383 A | 1/1998 | Terry et al. | 175/72 |
| 5,716,910 A | 2/1998 | Totten et al. | 507/102 |
| 5,759,964 A | 6/1998 | Shuchart et al. | 507/209 |
| 5,788,762 A | 8/1998 | Barger et al. | 106/706 |
| 5,789,352 A | 8/1998 | Carpenter et al. | 507/209 |
| 5,807,810 A | 9/1998 | Blezard et al. | |
| 5,851,960 A | 12/1998 | Totten et al. | 507/118 |
| 5,866,517 A | 2/1999 | Carpenter et al. | 507/226 |
| 5,913,364 A | 6/1999 | Sweatman | 166/281 |
| 5,990,052 A | 11/1999 | Harris | 507/214 |
| 6,060,434 A | 5/2000 | Sweatman et al. | 507/216 |
| 6,063,738 A | 5/2000 | Chatterji et al. | 507/269 |
| 6,070,664 A | 6/2000 | Dalrymple et al. | 166/281 |
| 6,138,759 A | 10/2000 | Chatterji et al. | 166/293 |
| 6,145,591 A | 11/2000 | Boncan et al. | 166/291 |
| 6,149,724 A | 11/2000 | Ulibarri et al. | |
| 6,167,967 B1 | 1/2001 | Sweatman | 166/281 |
| 6,170,575 B1 | 1/2001 | Reddy et al. | 166/293 |
| 6,171,386 B1 | 1/2001 | Sabins | 106/724 |
| 6,182,758 B1 | 2/2001 | Vijn | |
| 6,209,646 B1 | 4/2001 | Reddy et al. | |
| 6,213,213 B1 | 4/2001 | van Batenburg | 166/300 |
| 6,230,804 B1 | 5/2001 | Mueller et al. | 166/293 |
| 6,235,809 B1 | 5/2001 | Arias et al. | 523/130 |
| 6,245,142 B1 | 6/2001 | Reddy et al. | 106/724 |
| 6,258,757 B1 | 7/2001 | Sweatman et al. | 507/219 |
| 6,283,213 B1 | 9/2001 | Chan | 166/291 |
| 6,315,042 B1 | 11/2001 | Griffith et al. | 166/291 |
| 6,372,694 B1 | 4/2002 | Osinga et al. | |
| 6,379,456 B1 | 4/2002 | Heathman et al. | 106/724 |
| 6,390,197 B1 | 5/2002 | Maroy | |
| 6,405,801 B1 | 6/2002 | Vijn et al. | 166/293 |
| 6,409,819 B1 | 6/2002 | Ko | 106/707 |
| 6,457,524 B1 | 10/2002 | Roddy | 166/293 |
| 6,475,275 B1 | 11/2002 | Nebesnak et al. | 106/803 |
| 6,478,869 B1 | 11/2002 | Reddy et al. | 106/724 |
| 6,488,091 B1 | 12/2002 | Weaver et al. | 166/300 |
| 6,494,951 B1 | 12/2002 | Reddy et al. | 106/705 |
| 6,508,305 B1 | 1/2003 | Brannon et al. | 166/293 |
| 6,508,306 B1 | 1/2003 | Reddy et al. | 166/295 |
| 6,524,384 B1 | 2/2003 | Griffith et al. | 106/705 |
| 6,555,505 B1 | 4/2003 | King et al. | 507/202 |
| 6,565,647 B1 | 5/2003 | Day et al. | 106/813 |
| 6,566,310 B1 | 5/2003 | Chan | 507/211 |
| 6,572,698 B1 | 6/2003 | Ko | 106/772 |
| 6,610,139 B1 | 8/2003 | Crook et al. | 106/724 |
| 6,616,753 B1 | 9/2003 | Reddy et al. | 106/718 |
| 6,626,243 B1 | 9/2003 | Boncan | 166/293 |
| 6,645,289 B1 | 11/2003 | Sobolev et al. | 106/705 |
| 6,660,080 B1 | 12/2003 | Reddy et al. | 106/724 |
| 6,702,044 B1 * | 3/2004 | Reddy et al. | 175/64 |
| 6,722,434 B1 | 4/2004 | Reddy et al. | |
| 6,767,868 B1 | 7/2004 | Dawson et al. | |
| 6,832,652 B1 | 12/2004 | Dillenbeck et al. | |
| 6,840,319 B1 | 1/2005 | Chatterji et al. | |
| 6,889,767 B1 | 5/2005 | Reddy et al. | |
| 7,048,053 B1 * | 5/2006 | Santra et al. | 166/291 |
| 2001/0014651 A1 | 8/2001 | Reddy et al. | 502/408 |
| 2002/0077390 A1 | 6/2002 | Gonnon et al. | 524/42 |
| 2002/0091177 A1 | 7/2002 | Gonnon et al. | 524/5 |
| 2002/0117090 A1 | 8/2002 | Ku | 106/737 |
| 2002/0157575 A1 | 10/2002 | DiLullo et al. | 106/711 |
| 2003/0153466 A1 | 8/2003 | Allen et al. | 504/358 |
| 2003/0203996 A1 | 10/2003 | Gonnon et al. | 524/5 |
| 2004/0007162 A1 | 1/2004 | Morioka et al. | 106/714 |
| 2004/0040475 A1 | 3/2004 | Roij | 106/819 |
| 2004/0107877 A1 | 6/2004 | Getzlaf et al. | 106/813 |
| 2004/0108113 A1 | 6/2004 | Luke et al. | 166/292 |
| 2004/0112600 A1 | 6/2004 | Luke et al. | 166/295 |
| 2004/0188091 A1 | 9/2004 | Luke et al. | 166/291 |
| 2004/0188092 A1 | 9/2004 | Luke et al. | 166/291 |
| 2004/0244977 A1 | 12/2004 | Luke et al. | 166/292 |
| 2004/0262000 A1 | 12/2004 | Morgan et al. | |
| 2004/0262001 A1 | 12/2004 | Caveny et al. | |
| 2005/0000734 A1 | 1/2005 | Getzlaf et al. | 175/73 |
| 2005/0034864 A1 | 2/2005 | Caveny et al. | |
| 2005/0133222 A1 | 6/2005 | Arias et al. | |

FOREIGN PATENT DOCUMENTS

| | | |
|---|---|---|
| EP | 0 802 253 A1 | 10/1997 |
| EP | 0 895 971 A1 | 2/1999 |
| EP | 0 1260 491 A1 | 11/2002 |
| EP | 1 428 805 A1 | 6/2004 |
| FR | 763.998 | 11/1933 |
| GB | 1469954 | 4/1977 |
| GB | 2 353 523 A | 2/2001 |
| JP | 52117316 | 1/1977 |
| JP | 07 003254 | 1/1995 |
| JP | 1011487 | 4/1998 |
| SU | 1373781 A | 2/1988 |
| WO | WO 98/54108 | 12/1998 |
| WO | PCT 01/70646 A1 | 9/2001 |
| WO | WO 2005/059301 A1 | 6/2005 |

OTHER PUBLICATIONS

SPE 39595 entitled "Designing a Remedial Acid Treatment for Gulf of Mexico Deepwater Turbidite Sands Containing Zeolite Cement", by B.A. Rogers et al., dated 1998.

Paper entitled "Tectonis, fluid migration, and fluid pressure in a Deformed forearc basin, Cook Inlet, Alaska", by R.L. Bruhn et al., pp. 550-563, dated 2000.

Paper entitled "Hydraulic Conductivity Measurement On Discrete Samples Collected From Leg 141, Site 863", by Kevin Brown, pp. 401-405, dated 1995.

Paper entitled "Alteration of Clay Minerals And Zeolites In Hydrothermal Brines", by Sridhar Komarneni et al., papes 383-391, dated 1983.

Paper entitled "A Non-Conventional Way of Developing Cement Slurry For Geothermal Wells", by V. Barlet-Gouedard et al., pp. 85-91, dated 2001.

Paper entitled "Portland-Zeolite-Cement For Minimizing Alkali-Aggregate Expansion", by R. Serale, pp. 404-410, dated 1987.

Paper entitled "Zeolite Crystallization In Portland Cement Concrete Due To Alkali-Aggregate Reaction", by S.A. Marfil et al., paged 1283-1288, dated 1993.

Paper entitled "A study on the hydration rate of natural zeoite blended Cement pastes", by C.S. Poon et al., pp. 427-432, dated 1999.

Paper entitled "Zeolite ceramsite cellular concrete", by N-Q. Feng pp. 117-122, dated 2000.

Paper entitled "Immobilization of caesium-loaded ion excahnge resins in Zeolite-cement blends", by Sandor Bagosi et al., pp. 479-485, dated 1999.

Paper entitled "Effect of Bentonite and Zeolite on Durability of Cement Suspension under Sulfate Attack", by Ivan Janotka, pp. 710-715, dated 1988.

Paper entitled "Reuse of waste catalysts from petrochemical industries For cement substitution", by Nan Su et al., pp. 1773-1783, dated 2000.

Paper entitled "Extreme vertices design of concrete with combined Mineral admixtures", by Jian-Tong Ding et al., pp. 957-960, dated 1999.

Paper entitled "The Properties of Mortar Using Blends With Portland Cement Clinker, Zeolite Tuff and Gypsum", by Ivan Janotka, et al., pp. 105-110, dated 1995.

Paper entitled "Study on the suppression effect of natural zeolite on Expansion of concrete due to alkali-aggregate reaction", by Feng Naiqian et al., pp. 17-24, dated 1998.

Paper entitled "Comparative study of the initial surface absorption and Chloride diffusion of high performance zeolite, silica fume and PFA COncrete", by Sammy Y.N. Chan et al., pp. 293-300, dated 1999.

Paper entitled "A study on the hydration rate of natural zeolite Blended cement pastes", by C.S. Poon et al., pp. 427-432, dated 1999.

Baroid Brochure entitled "Aquagel Gold Seal®" dated 2002. Halliburton brochure entitled "CFR-2 Cement Friction Reducer" dated 1999.

Halliburton brochure entitled "CFR-3 Cement Friction Reducer" dated 1998. Halliburton brochure entitled "D-Air 2 Anti-Foam Agent" dated 1999.

Halliburton brochure entitled Halado®-344 Fluid Loss Additive dated 1998. Halliburton brochure entitled "Halado®-413 Fluid-Loss Additive" dated 1999.

Halliburton brochure entitled "HR®-5 Cement Additive" dated 1998. Halliburton brochure entitled "HR®-7 Cement Retarder" dated 1999.

Halliburton brochure entitled "MICROSAND Cement Additive" dated 1999. Halliburton brochure entitled SSA-1 Strength-Stabilizing Agent dated 1998.

Halliburton brochure entitled "SSA-2 Coarse Silica Four" dated 1999.

Halliburton brochure entitled "Baroid BARAZAN® PLUS" dated 2002. Halliburton brochure entitled "Baroid EX-MUD® Shale Stabilizer" dated 2002.

Halliburton brochure entitled "Baroid INVERMUL® Emulsifier" dated 2002. Halliburton brochure entitled "Baroid EZ MUL®" Emulsifier" dated 2002.

Halliburton brochure entitled "Baroid EZ MUL® NTE Emulsifier" dated 2002. Halliburton brochure entitled "Baroid GELTONE® II Viscosifer" dated 2002.

Halliburton brochure entitled "Baroid GELTONE® V Viscosifier" dated 2002.

Halliburton brochure entitled "Baroid DURATONE® HT Filtration Control Agent" dated 2002.

Office action from a related counterpart application dated Sep. 7, 2005.

Foreign communication from a related counterpart application dated Jul. 28, 2005.

Paper entitled "Zeolite P In Cements: Its Potential For Immobilizing Toxic And Radioactive Waste Species," by M. Atkins, et al., dated 1994.

Powder Diffraction File, PFD, Alphabetical Indexes for Experimental Patterns, Inorganic Phases, Sets 1-52, dated 2002.

Foreign communication from a related counterpart application dated Mar. 25, 2004.

Office action from a related counterpart application dated Dec. 4, 2003.

International Center for Materials Technology Promotion, "Special Cements and Their Production Technology: CSA Series, Hydraulic Cement Series, Oil Well Cement Series etc: Hydraulic Engineering Cement", (2003).

Portland Cement Association, "Portland Cement, Concrete, and Heat of hydration", Concrete Technology Today, (1997), pp. 1-4, vol. 18, No. 2, Construction Information Services Department of the Portland Cement Association.

Foreign communication from a related counterpart application dated Nov. 25, 2004.

U.S. communication from a related counterpart application dated Jun. 25, 2004.

U.S. communication from a related counterpart application dated Sep. 10, 2004.

U.S. communication from a related counterpart application dated Nov. 9, 2004.

Foreign communication from a related counterpart application dated Aug. 23, 2004.

Office action from a related counterpart application dated Sep. 4, 2005, serial No. 10/727,370.

Office Action from a related counterpart application (11/126,626) dated Dec. 7, 2005.

Office Action from a related counterpart application (10/795,158) dated Dec. 6, 2005.

Office Action dated Dec. 27, 2005 from a related counterpart application 10/816,034 filed Apr. 1, 2004.

Foreign communication from a related counterpart application dated Nov. 4, 2005.

Office Action from a related counterpart application, serial No. 10/623,443 dated Mar. 3, 2006.

Office Action from a related counterpart application, serial No. 11/126,626 dated Jun. 23, 2006.

Luke, K. et al., "Zeolite-Containing Remedial Compositions" filed Jul. 17, 2006 as serial No. 11/488,388.q.

Office action from application serial No. 10/623,443 dated Jul. 27, 2006.

Office Action from a related counterpart application, serial number 11/338,485 dated Aug. 11, 2006.

* cited by examiner

ZEOLITE-CONTAINING SETTABLE SPOTTING FLUIDS

CROSS-REFERENCE TO RELATED APPLICATIONS

This application is a continuation-in-part of a prior application Ser. No. 10/727,370 filed Dec. 4, 2003, the entire disclosure of which is incorporated herein by reference, which itself is a continuation-in-part of prior application Ser. No. 10/686,098 filed Oct. 15, 2003, (now U.S. Pat. No. 6,964,302, issued Nov. 15, 2005), the entire disclosure of which is incorporated herein by reference, which itself is a continuation-in-part of prior application Ser. No. 10/623,443 filed Jul. 18, 2003, the entire disclosure of which is incorporated herein by reference, and which itself is a continuation-in-part of prior application Ser. No. 10/315,415, filed Dec. 10, 2002, (now U.S. Pat. No. 6,989,057, issued Jan. 24, 2006), the entire disclosure of which is incorporated herein by reference.

BACKGROUND

The present embodiments relate generally to wellbore treating fluids introduced into a subterranean zone penetrated by a wellbore, particularly wellbore treating fluids introduced as settable spotting fluids.

Conventionally, a wellbore is drilled using a drilling fluid that is continuously circulated down a drill pipe, through a drill bit, and upwardly through the wellbore to the surface. Typically, after a wellbore has been drilled to total depth, the drill bit is withdrawn from the wellbore, and circulation of the drilling fluid is stopped, thereby initiating a shutdown period. During the shutdown period, the drilling fluid is typically left in the wellbore, and a filter cake of solids from the drilling fluid, and additional dehydrated drilling fluid and gelled drilling fluid, typically forms on the walls of the wellbore.

The next operation in completing the wellbore usually involves running a pipe string, e.g., casing, into the wellbore. While the pipe is being run, the drilling fluid left in the wellbore remains relatively static. During that time, the stagnant drilling fluid progressively increases in gel strength, whereby portions of the drilling fluid in the wellbore can become increasingly difficult to displace during subsequent clean-up operations.

After the pipe is run in the wellbore, the next operation typically involves cleaning out the wellbore, which may be accomplished by re-initiating circulation of drilling fluid. The drilling fluid is circulated downwardly through the interior of the pipe and upwardly through the annulus between the exterior of the pipe and the walls of the wellbore, while removing drilling solids, gas, filter cake, dehydrated drilling fluid, gelled drilling fluid, and any other undesired substances needing to be removed from the wellbore.

After clean-up operations are performed in the wellbore, primary cementing operations are typically performed therein. Namely, the pipe is cemented in the wellbore by placing a cement slurry in the annulus between the pipe and the walls of the wellbore. The cement slurry sets into a hard impermeable mass, and is intended to bond the pipe to the walls of the wellbore whereby the annulus is sealed and fluid communication between subterranean zones or to the surface by way of the annulus is prevented.

During any of the above or other operations performed in the wellbore, a number of problems can occur, including difficulty in removing portions of the drilling fluid, or inability to achieve a satisfactory bond between the pipe and the walls of the wellbore because of drilling fluid that remained in the wellbore during primary cementing operations.

Difficulty in removing portions of the drilling fluid is often caused by an increase in the gel strength of the drilling fluid, which is often due to the amount of time the drilling fluid has been left stagnant in the wellbore. In addition, polymeric viscosifiers and additives in the drilling fluid contribute to the formation of a filter cake that is generally very stable and can be difficult to remove. If appreciable drilling fluid and/or filter cake remain in the wellbore or on the walls of the wellbore, a satisfactory bond between the pipe, primary cement and the walls of the wellbore will not be achieved, which can lead to fluid leakage through the annulus and other problems.

Removal of the drilling fluid and filter cake from the wellbore is often attempted by running flushes, washes or spacer fluids through the annulus between the pipe and the walls of the wellbore prior to cementing. Other methods for removing drilling fluid and preventing filter cake from interfering with subsequent primary cementing operations include at least partially displacing the drilling fluid with a settable spotting fluid composition (also referred to as a "settable spotting fluid") before the drilling fluid in the wellbore has had a chance to gain significant gel strength. Conventional settable spotting fluids include a material that sets over time, such as blast furnace slag, fly ash, and similar hydraulic components. Still other methods for achieving satisfactory primary cementing operations when deposits of filter cake are an issue include laying down a filter cake including a settable material on the walls of the wellbore and activating the settable material to set.

The present embodiments provide wellbore treating fluids in the form of settable spotting fluids that include zeolite as a settable material, and methods for causing the zeolite to set and using such settable spotting fluids in drilling operations.

DESCRIPTION

According to embodiments described herein, wellbore treating fluids comprising zeolite are introduced into a wellbore in the form of a settable spotting fluid.

Methods according to the present embodiments provide for introducing a wellbore treating fluid comprising zeolite into a wellbore penetrating a subterranean zone, introducing a subsequent composition comprising a compressive strength-developing amount of an activator into the wellbore to displace all but a remaining portion of the wellbore treating fluid from the wellbore, contacting the zeolite in the remaining portion of the wellbore treating fluid with the activator, and allowing the zeolite to set.

Other methods according to the present embodiments provide for introducing a wellbore treating fluid comprising zeolite, a compressive strength-developing amount of an activator, and a retarder, into a wellbore penetrating a subterranean zone, introducing a subsequent composition into the wellbore to displace all but a remaining portion of the wellbore treating fluid from the wellbore, and allowing the zeolite in the remaining portion of the wellbore treating fluid to set.

Setting of the zeolite according to the present embodiments is similar to the setting of settable materials in conventional settable spotting fluids, that is, the zeolite sets into a relatively hard mass. The compressive strength of the set mass formed by the zeolite can be measured and compared to compressive strengths of set materials in conventional settable spotting fluids.

In practicing methods according to the present embodiments, drilling fluid (also referred to herein as "mud") remaining in a wellbore during a shutdown period is at least partially displaced with a settable spotting fluid comprising zeolite. Preferably, the mud in the wellbore is displaced with the settable spotting fluid before the mud has had a chance to gain significant gel strength. By displacing the mud before it gains significant gel strength, difficulties with removing portions of it during clean-up operations in the wellbore are reduced. As used herein, the term "mud" encompasses any fluid used in hydrocarbon drilling operations, including but not limited to all types of water-base, oil-base and synthetic-base drilling fluids, and fluids that contain significant amounts of suspended solids, emulsified water or oil.

According to one embodiment where a settable spotting fluid comprising zeolite at least partially displaces mud from the wellbore, the settable spotting fluid is subsequently flushed out of the wellbore by washes or spacer fluids circulated through the wellbore. A cement slurry may then be pumped into the annulus and allowed to set, thus bonding the pipe to the walls of the wellbore. The setting of the cement, and consequently the bonding of the pipe to the walls of the wellbore, is improved because difficulties with removing portions of the mud from the wellbore are reduced.

According to another embodiment where a settable spotting fluid comprising zeolite at least partially displaces mud from a wellbore, portions of the settable spotting fluid remain on the walls of the wellbore as part of the filter cake, and/or in permeable areas affecting the wellbore, such as fissures, fractures, caverns, vugs, thief zones, low pressure subterranean zones or high pressure subterranean zones, even if washes or spacer fluids are introduced into the wellbore subsequent to the settable spotting fluid. According to such an embodiment, a subsequent composition, for example, a drilling fluid, pill, spotting fluid or other mud, which contains at least one activator, is pumped into the wellbore. The subsequent composition is pumped into the wellbore, either after the settable spotting fluid, or after the washes or spacer fluids, if such are used. When the activator in the subsequent composition contacts the settable spotting fluid remaining in the filter cake and/or permeable areas, the activator causes the zeolite therein to set. The activator is present in the subsequent composition in a compressive strength-developing amount, and may be one or more of calcium hydroxide, sodium silicate, sodium fluoride, sodium silicofluoride, magnesium silicofluoride, zinc silicofluoride, sodium carbonate, potassium carbonate, sodium hydroxide, potassium hydroxide, sodium sulfate, and mixtures thereof. Selection of the type and amount of an activator(s) largely depends on the type and make-up of the composition in which the activator is contained, and it is within the means of those of ordinary skill in the art to select a suitable type and amount of activator.

According to yet another embodiment where portions of a settable spotting fluid comprising zeolite remain on the walls of the wellbore as part of the filter cake, and/or in permeable areas affecting the wellbore, primary cementing operations are performed by introducing a cement slurry containing at least one activator into the wellbore. The cement slurry can be introduced after the settable spotting fluid to displace the settable spotting fluid from the wellbore, or can be introduced after a wash or spacer fluid that was pumped into the wellbore after the settable spotting fluid. As the cement slurry is pumped, and as it begins to set in the wellbore, the activator therein diffuses into the settable spotting fluid remaining in the filter cake and/or permeable areas, and causes the zeolite to set. The activator is present in the cement slurry in a compressive strength-developing amount, and may be one or more of calcium hydroxide, sodium silicate, sodium fluoride, sodium silicofluoride, magnesium silicofluoride, zinc silicofluoride, sodium carbonate, potassium carbonate, sodium hydroxide, potassium hydroxide, sodium sulfate, and mixtures thereof. Selection of the type and amount of an activator(s) largely depends on the nature and composition of the cement slurry, and it is within the means of those of ordinary skill in the art to select a suitable type and amount of activator.

According to yet another embodiment, a settable spotting fluid comprising zeolite, a compressive strength-developing amount of at least one activator and at least one retarder is introduced into a wellbore. Portions of the settable spotting fluid remain on the walls of the wellbore as part of the filter cake, and/or in permeable areas affecting the wellbore, even if washes or spacer fluids are introduced into the wellbore subsequent to the settable spotting fluid. The activator in the settable spotting fluid causes the zeolite in the remaining portions to set, while the retarder slows the set so that it occurs over a desired period of time. According to such an embodiment, other drilling operations can proceed, which operations may require other muds, fluids, or compositions to be subsequently pumped into the wellbore. If subsequent muds, fluids, or compositions are pumped into the wellbore, they may or may not comprise an activator. As above, the activator in the settable spotting fluid may be one or more of calcium hydroxide, sodium silicate, sodium fluoride, sodium silicofluoride, magnesium silicofluoride, zinc silicofluoride, sodium carbonate, potassium carbonate, sodium hydroxide, potassium hydroxide, sodium sulfate, and mixtures thereof. Suitable retarders include but are not limited to one or more of a lignosulfonate, an organic acid having an α-hydroxy group such as citric acid, tartaric acid or gluconic acid, and combinations of both lignosulfonate and organic acid having an α-hydroxy group. Selection of the type and amount of activator(s) and retarder(s) largely depends on the nature and composition of the settable spotting fluid, and it is within the means of those of ordinary skill in the art to select a suitable type and amount of activator and retarder. Moreover, it is within the means of those of ordinary skill in the art to exert control over the amount of time that it takes the zeolite to set by determining, through the exercise of routine experimentation, the amount of retarder necessary to achieve a set over a desired period of time.

Thus, in addition to reducing difficulties with removing drilling fluid during clean-up operations, a settable spotting fluid comprising zeolite also provides a method by which zeolite remaining in the wellbore after displacement of the settable spotting fluid can be caused to set. Zeolite that sets in permeable areas affecting the wellbore, such as fissures, fractures, caverns, vugs, thief zones, low pressure subterranean zones or high pressure subterranean zones effectively seals such permeable areas, thereby preventing the entry or flow of formation fluids into the annulus.

Zeolites are porous alumino-silicate minerals that may be either a natural or manmade material. Manmade zeolites are based on the same type of structural cell as natural zeolites, and are composed of aluminosilicate hydrates having the same basic formula as given below. It is understood that as used in this application, the term "zeolite" means and encompasses all natural and manmade forms of zeolites. All zeolites are composed of a three-dimensional framework of $SiO_4$ and $AlO_4$ in a tetrahedron, which creates a very high surface area. Cations and water molecules are entrained into the framework. Thus, all zeolites may be represented by the crystallographic unit cell formula:

$$M_{a/n}[(AlO_2)_a(SiO_2)_b] \cdot xH_2O$$

where M represents one or more cations such as Na, K, Mg, Ca, Sr, Li or Ba for natural zeolites and $NH_4$, $CH_3NH_3$, $(CH_3)_3NH$, $(CH_3)_4N$, Ga, Ge and P for manmade zeolites; n represents the cation valence; the ratio of b:a is in a range from greater than or equal to 1 and less than or equal to 5; and x represents the moles of water entrained into the zeolite framework.

Preferred zeolites for use in the wellbore treating fluids of the present embodiments include analcime (hydrated sodium aluminum silicate), bikitaite (lithium aluminum silicate), brewsterite (hydrated strontium barium calcium aluminum silicate), chabazite (hydrated calcium aluminum silicate), clinoptilolite (hydrated sodium aluminum silicate), faujasite (hydrated sodium potassium calcium magnesium aluminum silicate), harmotome (hydrated barium aluminum silicate), heulandite (hydrated sodium calcium aluminum silicate), laumontite (hydrated calcium aluminum silicate), mesolite (hydrated sodium calcium aluminum silicate), natrolite (hydrated sodium aluminum silicate), paulingite (hydrated potassium sodium calcium barium aluminum silicate), phillipsite (hydrated potassium sodium calcium aluminum silicate), scolecite (hydrated calcium aluminum silicate), stellerite (hydrated calcium aluminum silicate), stilbite (hydrated sodium calcium aluminum silicate) and thomsonite (hydrated sodium calcium aluminum silicate). Most preferably, the zeolites for use in the wellbore treating fluids of the present embodiment include chabazite and clinoptilolite.

Carrier fluids suitable for use in the embodiments of wellbore treating fluids, such as settable spotting fluids disclosed herein, comprise aqueous fluids, oil-based and synthetic-based fluids, emulsion, acids, or mixtures thereof. Exemplary aqueous fluids include but are not limited to water and water-based gels. When the carrier fluid comprises water, the water can be fresh water, unsaturated salt solution, including brines and seawater, and saturated salt solution. Exemplary oil-based fluids include but are not limited to canola oil, kerosene, diesel oil, fish oil, mineral oil, sunflower oil, corn oil, soy oil, olive oil, cottonseed oil, peanut oil and paraffin. Exemplary synthetic-based fluids include but are not limited to esters, olefins and ethers. The preferred carrier fluid for the wellbore treating fluid comprising zeolite as disclosed herein depends upon the properties desired for the wellbore treating fluid, as well as the cost, availability, temperature, stability, viscosity, clarity, and the like of the carrier fluid.

According to one embodiment, a settable spotting fluid comprising zeolite is prepared by mixing an amount of zeolite with a carrier fluid in an amount of from about 100 to about 200 weight percent, based on the weight of the amount of zeolite. According to embodiments where a settable spotting fluid comprising zeolite at least partially displaces a mud, the mud can be a water-based drilling fluid, an oil-based drilling fluid, or a synthetic-based drilling fluid.

In carrying out the methods of the present embodiments, a wellbore treating fluid comprising zeolite and at least one carrier fluid is introduced into a wellbore to at least partially displace a mud from the wellbore. A subsequent composition is introduced into the wellbore to displace all but a remaining portion of the wellbore treating fluid from the wellbore. The zeolite in the remaining portion of the wellbore treating fluid sets into a relatively hard mass. Displacement of the mud from the wellbore and setting of zeolite remaining in the wellbore contribute to the creation of satisfactory conditions for primary cementing operations. In addition, setting of zeolite that remained in one or more permeable areas affecting the wellbore, such as fissures, fractures, caverns, vugs, thief zones, low pressure subterranean zones or high pressure subterranean zones effectively seals such permeable areas, thereby preventing the entry or flow of formation fluids into the annulus.

The following examples are illustrative of the foregoing methods and compositions.

EXAMPLE 1

Six settable spotting fluids ("Spots") were prepared by combining the components as set forth in TABLE 1 below. Specifically, the zeolite and the hydrated lime were dry-mixed by hand in a glass jar. This dry mix was then added over a 15 second period to a carrier fluid being maintained in a Waring blender at 4,000 RPM. The blender speed was then increased to 12,000 RPM and mixing was continued for 35 seconds.

According to the embodiments illustrated in Table 1, the carrier fluid was water. The amount of hydrated lime and water used to form each settable spotting fluid is reported in the table as a "% bwoZ", which indicates a weight percent based on the weight of the zeolite.

Chabazite was used as the zeolite for Spots 1–4, and clinoptilolite was used as the zeolite for Spots 5–6. Each of these zeolites is commercially available from C2C Zeolite Corporation of Calgary, Canada.

The compressive strength for each of Spots 1–6 was determined by Non-Destructive Sonic Testing as set forth in API Specification 10B 22nd Edition, 1997, of the American Petroleum Institute, the entire disclosure of which is incorporated herein by reference as if reproduced in its entirety. As reported in Table 1, the compressive strength was measured at 160° F. at the reported elapsed times. The measured compressive strength is reported in Table 1 in pounds per square inch (psi).

TABLE 1

|  | Spot 1 | Spot 2 | Spot 3 | Spot 4 | Spot 5 | Spot 6 |
| --- | --- | --- | --- | --- | --- | --- |
| Components |  |  |  |  |  |  |
| Zeolite (chabazite) wt. % | 100 | 100 | 100 | 100 | 0 | 0 |
| Zeolite (clinoptilolite) wt. % | 0 | 0 | 0 | 0 | 100 | 100 |
| Hydrated Lime (% bwoZ) | 7 | 10 | 15 | 35 | 15 | 35 |
| Water (% bwoZ) | 106 | 109 | 114 | 136 | 114 | 136 |
| Compressive Strength (psi) |  |  |  |  |  |  |
| Measured at 160° F. |  |  |  |  |  |  |

TABLE 1-continued

|  | Spot 1 | Spot 2 | Spot 3 | Spot 4 | Spot 5 | Spot 6 |
|---|---|---|---|---|---|---|
| and at Time |  |  |  |  |  |  |
| Time: 4 Hr | 0 | 280 | 500 | 500 | 250 | 250 |
| Time: 8 Hr | 0 | 290 | 540 | 700 | 340 | 440 |
| Time: 12 Hr | 0 | 290 | 568 | 730 | 350 | 530 |
| Time: 24 Hr | 0 | 290 | 568 | 750 | 374 | 590 |

The compressive strength data indicates that wellbore treating fluids comprising zeolite and water, such as the settable spotting fluids illustrated in Example 1, develop compressive strengths when the amount of an activator, such as lime, is present in an amount greater than about 7% based on the weight of the zeolite. The identity of the activator, zeolite, and carrier fluid may influence the amount of activator necessary to cause the settable spotting fluid to set; thus, in some embodiments, the settable spotting fluid may develop compressive strength with activator amounts less than the 7% illustrated by Example 1. Accordingly, the amount of activator used in practicing the present embodiments need only be at least a compressive strength-developing amount. Those of ordinary skill in the art can determine through the exercise of routine experimentation the amount of an activator sufficient for the development of compressive strength.

The compressive strength data also indicates that wellbore treating fluids comprising zeolite and water, such as the settable spotting fluids of Spots 2–6, develop compressive strengths that are suitable for use with wellbore applications in which conventional settable spotting fluids are used.

The compressive strength data also illustrates that settable spotting fluids comprising zeolite and water develop an early compressive strength, which increases over time. This illustrates that the zeolite will set, and is a satisfactory substitute for settable material, such as blast furnace slag, fly ash and other hydraulic materials, used in conventional settable spotting fluids. In the settable spotting fluids of Example 1, setting of the zeolite was caused by the lime, also known as calcium hydroxide, which is a known activator for converting settable material in conventional settable spotting fluids. Thus, when an activator, such as lime, is brought into contact with a wellbore treating fluid comprising zeolite, such as the settable spotting fluids illustrated herein, the activator causes the zeolite to set.

Contact between an activator and a settable material can be accomplished by various methods well known to those of ordinary skill in the art. The addition of the lime and zeolite together in a settable spotting fluid as described in this example simulates two of the various methods suitable for bringing an activator into contact with the zeolite. According to the first method simulated by this example, zeolite from wellbore treating fluids, such as the settable spotting fluids illustrated herein, remains on the walls of the wellbore as part of the filter cake, and/or in permeable areas affecting the wellbore, such as fissures, fractures, caverns, vugs, thief zones, low pressure subterranean zones or high pressure subterranean zones, even if subsequent washes or spacer fluids are used to displace the wellbore treating fluid. An activator is brought into contact with the zeolite remaining in the wellbore by circulation of a subsequent composition, such as a drilling fluid, pill, spotting fluid or other mud, which contains the activator. According to the second method simulated by this example, an activator is brought into contact with the zeolite remaining in the wellbore by diffusion of an activator contained in a cement slurry that is subsequently pumped into the wellbore during primary cementing operations.

The two methods simulated by this example are exemplary only, as a variety of methods for bringing a settable material into contact with an activator, which are well known to those of ordinary skill in the art, are suitable for use with the present embodiments. Example 2 illustrates yet another method.

EXAMPLE 2

Three settable spotting fluids (Spots 1, 2, and 3) were prepared by combining the components as set forth in TABLE 2A below. Specifically, the zeolite, hydrated lime, and retarder were dry-mixed by hand in a glass jar. This dry mix was then added over a 15 second period to a carrier fluid being maintained in a Waring blender at 4,000 RPM. The blender speed was then increased to 12,000 RPM and mixing was continued for 35 seconds.

According to the embodiment illustrated in Table 2A, the carrier fluid was water. The amount of hydrated lime, retarder and water used to form the settable spotting fluid is reported in the table as a "% bwoZ", which indicates a weight percent based on the weight of the zeolite. chabazite, which is commercially available from C2C Zeolite Corporation of Calgary, Canada, was used as the zeolite. The retarder comprised a 2/1 lignosulfonate/tartaric acid solution, which is commercially available under the tradename HR-13L from Halliburton Energy Services, Duncan, Okla.

TABLE 2A

| Components | Spot 1 | Spot 2 | Spot 3 |
|---|---|---|---|
| Zeolite (wt. %) (chabazite) | 100 | 100 | 100 |
| Hydrated Lime (% bwoZ) | 15 | 15 | 15 |
| Retarder (HR-13 L) (% bwoZ) | 3.2 | 3.2 | 3.6 |
| Water (% bwoZ) | 97.64 | 97.64 | 97.64 |

The strengths of each of Spots 1, 2 and 3 were then tested at the temperatures and times reported in Table 2B. Up to Day 3, each of Spots 1, 2 and 3 were gelatinous. Thus, the gel strength of each of Spots 1, 2 and 3 was measured according to API Recommended Practice Standard Procedure for Field Testing Drilling Fluids 13B, Appendix B, Shear Strength Measurement using Shearometer Tube, the entire disclosure of which is incorporated herein by reference. The test was performed using a Fann® Model 240 Shearometer, available from Fann Instrument Company, Houston, Tex., and operated according to the Fann® Model 240 Shearometer Instruction Card, the entire disclosure of which is incorporated herein by reference. The gel strength of each of Spots 1, 2 and 3 are reported in Table 2A in pounds per 100 square feet of area ("lb/100 ft$^2$").

After Spots 1, 2 and 3 turned from gelatinous to solid, the compressive strengths at Days 5 and 6 as reported in Table 2B were determined. The compressive strengths are reported in Table 2B in pounds per square inch ("psi"). To determine the compressive strength, each of Spots 1, 2 and 3 were placed in sealed cylindrical plastic containers, 2 inches in diameter by 4 inches in height. Each plastic container was placed in a water bath at the temperature reported in Table 2B, under atmospheric pressure, for the time periods reported in Table 2B. Each plastic container was then removed from the water bath, allowed to cool, and the cylindrical samples were demolded. The top end of each cylindrical sample was cut using a tile saw to give a smooth and level surface. The remainder of the sample was then placed in a Tinius Olsen universal testing machine and the compressive strength determined according to operating procedures for the universal testing machine.

displaced by the settable spotting fluid comprising zeolite before the mud has had an opportunity to develop a gel strength significant enough to make its displacement difficult. After the mud is at least partially displaced by the settable spotting fluid, a cement slurry may then be pumped into the annulus. The cement slurry is allowed to set, thus bonding the pipe to the walls of the wellbore. The setting of the cement, and consequently the bonding of the pipe to the walls of the wellbore, is improved because difficulties with removing portions of the drilling fluid in the wellbore are reduced.

While the embodiments described herein relate to wellbore treating fluids provided as settable spotting fluids, it is understood that any wellbore treating fluids such as drilling, completion and stimulation fluids including, but not limited to, drilling muds, cement compositions, remedial compositions, well cleanup fluids, workover fluids, spacer fluids,

TABLE 2B

Gel Strength and Compressive Strength Measured at Temp ° F. and at Time

| Spot #: Test Temp. | Time Day 1 | Time Day 2 | Time Day 3 | Time Day 4 | Time Day 5 | Time Day 6 |
|---|---|---|---|---|---|---|
| Spot 1: Temp: 140° F. | <10 lb/100 ft$^2$ | <10 lb/100 ft$^2$ | <10 lb/100 ft$^2$ | ~100 lb/100 ft$^2$ | gel turned to solid | >250 psi |
| Spot 2: Temp: 160° F. | <10 lb/100 ft$^2$ | <10 lb/100 ft$^2$ | <10 lb/100 ft$^2$ | gel turned to solid | >280 psi | not taken |
| Spot 3: Temp: 190° F. | <10 lb/100 ft$^2$ | <10 lb/100 ft$^2$ | <10 lb/100 ft$^2$ | ~100 lb/100 ft$^2$ | gel turned to solid | >230 psi |

The gel strength and compressive strength data indicates that wellbore treating fluids comprising zeolite, water, at least one activator and at least one retarder, such as the settable spotting fluid illustrated in Table 2A, develop strength over time at a range of temperatures. This illustrates that the zeolite will set, and is a satisfactory substitute for settable material, such as blast furnace slag, fly ash and other hydraulic materials, used in conventional settable spotting fluids. The identity of the activator(s), zeolite, retarder(s) and carrier fluid(s) may influence the amount of activator necessary to cause the settable spotting fluid to set, as well as the amount of retarder necessary to slow the set. Accordingly, the amount of activator used in practicing the present embodiments is described as a compressive strength-developing amount. Moreover, the amount of retarder can be adjusted up or down to control the amount of time it takes for the settable spotting fluid to develop strength. Those of ordinary skill in the art can determine a desirable time to achieve a set, and through the exercise of routine experimentation, determine the amount of retarder necessary to achieve a set over the desired period of time. Accordingly, the amounts of activator, zeolite, retarder and carrier fluid as listed in Example 2 are merely an exemplary embodiment.

In the settable spotting fluid illustrated in Example 2, the activator (i.e., the lime) caused the zeolite to set, while the retarder slowed the set so that setting occurred over time. This illustrates yet another method for bringing an activator into contact with the zeolite in portions of settable spotting fluid that remains in the wellbore.

Moreover, the present embodiments provide a method for performing drilling operations wherein a wellbore treating fluid comprising zeolite, such as the settable spotting fluids illustrated by Examples 1 and 2, at least partially displaces a mud used to drill a wellbore. Preferably, the mud is gravel pack fluids, acidizing fluids, fracturing fluids, conformance fluids and the like can be prepared using zeolite and a carrier fluid. Accordingly, improved methods of the present invention comprise preparing a wellbore treating fluid using at least one carrier fluid and zeolite, as previously described herein, and placing the fluid in a subterranean formation. Other methods according to the present embodiments include performing drilling operations, completing and/or stimulating a subterranean formation, and performing primary cementing operations using a wellbore treating fluid comprising zeolite and at least one carrier fluid.

Other embodiments of the current invention will be apparent to those skilled in the art from a consideration of this specification or practice of the invention disclosed herein. However, the foregoing specification is considered merely exemplary of the current invention with the true scope and spirit of the invention being indicated by the following claims.

The invention claimed is:

1. A method of performing operations in a wellbore comprising:
   penetrating a subterranean zone with a wellbore;
   introducing a wellbore treating fluid comprising zeolite and at least one carrier fluid into the wellbore;
   introducing a subsequent composition to displace all but a remaining portion of the wellbore treating fluid from the wellbore; and
   setting the zeolite in the remaining portion of the wellbore treating fluid with a compressive strength-developing amount of at least one activator,
   wherein the zeolite is selected from the group consisting of analcime, bikitaite, brewsterite, chabazite, clinoptilolite, faujasite, harmotome, heulandite, laumontite, mesolite, natrolite, paulingite, phillipsite, scolecite, stellerite, stilbite, and thomsonite.

2. The method of claim 1 wherein the subsequent composition comprises the compressive strength-developing amount of the activator.

3. The method of claim 1 wherein the remaining portion of the wellbore treating fluid is in one or more of a filter cake, fissure, fracture, cavern, vug, thief zone, low pressure subterranean zone, and high pressure subterranean zone in the wellbore.

4. The method of claim 3 wherein setting the zeolite seals one or more of a fissure, fracture, cavern, vug, thief zone, low pressure subterranean zone, and high pressure subterranean zone in the wellbore.

5. The method of claim 1 wherein the penetrating of the subterranean zone with a wellbore comprises drilling the wellbore with a mud, and wherein the introducing of the wellbore treating fluid at least partially displaces the mud from the wellbore.

6. The method of claim 1 wherein the at least one activator is selected from the group consisting of calcium hydroxide, sodium silicate, sodium fluoride, sodium silicofluoride, magnesium silicofluoride, zinc silicofluoride, sodium carbonate, potassium carbonate, sodium hydroxide, potassium hydroxide, sodium sulfate, and mixtures thereof.

7. The method of claim 1 wherein the subsequent composition comprises:
a slurry comprising cement and a compressive strength-developing amount of at least one activator; and wherein
the at least one activator diffuses into contact with the zeolite in the remaining portion of the wellbore treating fluid.

8. The method of claim 7 wherein the at least one activator is selected from the group consisting of calcium hydroxide, sodium silicate, sodium fluoride, sodium silicofluoride, magnesium silicofluoride, zinc silicofluoride, sodium carbonate, potassium carbonate, sodium hydroxide, potassium hydroxide, sodium sulfate, and mixtures thereof.

9. The method of claim 1 wherein the subsequent composition comprises:
at least one of a mud, a spotting fluid, a pill and a cement slurry comprising a the compressive strength-developing amount of the at least one activator.

10. The method of claim 9 wherein the at least one activator is selected from the group consisting of calcium hydroxide, sodium silicate, sodium fluoride, sodium silicofluoride, magnesium silicofluoride, zinc silicofluoride, sodium carbonate, potassium carbonate, sodium hydroxide, potassium hydroxide, sodium sulfate, and mixtures thereof.

11. The method of claim 1 wherein the at least one carrier fluid comprises a water-based carrier fluid in an amount of from about 100 to about 200 percent by weight of the zeolite.

12. The method of claim 1 wherein the at least one carrier fluid is selected from the group consisting of water and water-based gels.

13. The method of claim 1 wherein the at least one carrier fluid is selected from the group consisting of fresh water, unsaturated salt solution, brine, seawater, and saturated salt solution.

14. The method of claim 1 wherein the at least one carrier fluid comprises an oil-based fluid selected from the group consisting of canola oil, kerosene, diesel oil, fish oil, mineral oil, sunflower oil, corn oil, soy oil, olive oil, cottonseed oil, peanut oil and paraffin.

15. The method of claim 1 wherein the wellbore treating fluid further comprises the compressive strength-developing amount of the at least one activator, and at least one retarder.

16. The method of claim 15 wherein the remaining portion of the wellbore treating fluid is in one or more of a filter cake, fissure, fracture, cavern, vug, thief zone, low pressure subterranean zone, and high pressure subterranean zone in the wellbore.

17. The method of claim 16 wherein the setting of the zeolite seals one or more of a fissure, fracture, cavern, vug, thief zone, low pressure subterranean zone, and high pressure subterranean zone in the wellbore.

18. The method of claim 15 wherein the at least one activator is selected from the group consisting of calcium hydroxide, sodium silicate, sodium fluoride, sodium silicofluoride, magnesium silicofluoride, zinc silicofluoride, sodium carbonate, potassium carbonate, sodium hydroxide, potassium hydroxide, sodium sulfate, and mixtures thereof.

19. The method of claim 15 wherein the at least one retarder is selected from the group consisting of lignosulfonates, citric acids, tartaric acids, gluconic acids, organic acids having an $\alpha$-hydroxy group, and combinations thereof.

20. The method of claim 15 further comprising placing a cement slurry in the wellbore after the introducing of the subsequent composition.

21. The method of claim 15 wherein the introducing of the subsequent composition comprises introducing at least one of a mud, a spotting fluid, a pill and a cement slurry into the wellbore.

22. The method of claim 21 wherein the subsequent composition comprises at least one activator.

23. The method of claim 22 wherein the at least one activator is selected from the group consisting of calcium hydroxide, sodium silicate, sodium fluoride, sodium silicofluoride, magnesium silicofluoride, zinc silicofluoride, sodium carbonate, potassium carbonate, sodium hydroxide, potassium hydroxide, sodium sulfate, and mixtures thereof.

24. A method of performing operations in a wellbore comprising:
drilling a wellbore in a subterranean zone with a mud;
introducing a wellbore treating fluid comprising zeolite and at least one carrier fluid into the wellbore, wherein the wellbore treating fluid at least partially displaces the mud from the wellbore;
introducing a subsequent composition into the wellbore, wherein the subsequent composition displaces all but a remaining portion of the wellbore treating fluid from the wellbore; and
setting the zeolite in the remaining portion of the wellbore treating fluid with a compressive strength developing amount of at least one activator.

25. The method of claim 24 wherein the at least one activator is selected from the group consisting of calcium hydroxide, sodium silicate, sodium fluoride, sodium silicofluoride, magnesium silicofluoride, zinc silicofluoride, sodium carbonate, potassium carbonate, sodium hydroxide, potassium hydroxide, sodium sulfate, and mixtures thereof.

26. The method of claim 24 wherein the subsequent composition comprises the compressive strength developing amount of the at least one activator.

27. The method of claim 26 wherein the subsequent composition comprises a cement slurry, and further comprising allowing the at least one activator to diffuse from the cement slurry into contact with the zeolite in the remaining portion of the wellbore treating fluid.

28. The method of claim 24 wherein the wellbore treating fluid further comprises the compressive-strength developing amount of the least one activator, and at least one retarder.

29. The method of claim 24 wherein the setting of the zeolite seals one or more of a fissure, fracture, cavern, vug, thief zone, low pressure subterranean zone, and high pressure subterranean zone in the wellbore.

30. The method of claim 24 wherein the zeolite is represented by the formula:

$$M_{a/n}[(AlO_2)_a(SiO_2)_b] \cdot xH_2O$$

where M represents one or more cations selected from the group consisting of Na, K, Mg, Ca, Sr, Li, Ba, $NH_4$, $CH_3NH_3$, $(CH_3)_3NH$, $(CH_3)_4N$, Ga, Ge and P; n represents the cation valence; the ratio of b:a is in a range from greater than or equal to 1 and less than or equal to 5; and x represents the moles of water entrained into the zeolite framework.

31. The method of claim 24 wherein the zeolite is selected from the group consisting of analcime, bikitaite, brewsterite, chabazite, clinoptilolite, faujasite, harmotome, heulandite, laumontite, mesolite, natrolite, paulingite, phillipsite, scolecite, stellerite, stilbite, and thomsonite.

32. The method of claim 24 wherein the at least one carrier fluid is selected from the group consisting of water and water-based gels.

33. The method of claim 24 wherein the at least one carrier fluid is selected from the group consisting of fresh water, unsaturated salt solution, brine, seawater, and saturated salt solution.

34. The method of claim 24 wherein the at least one carrier fluid comprises an oil-based fluid selected from the group consisting of canola oil, kerosene, diesel oil, fish oil, mineral oil, sunflower oil, corn oil, soy oil, olive oil, cottonseed oil, peanut oil and paraffin.

35. A method of performing operations in a wellbore comprising:
   introducing a wellbore treating fluid comprising zeolite and at least one carrier fluid into a wellbore penetrating a subterranean zone, wherein the at least one carrier fluid comprises an oil-based fluid selected from the group consisting of canola oil, kerosene, diesel oil, fish oil, mineral oil, sunflower oil, corn oil, soy oil, olive oil, cottonseed oil, peanut oil and paraffin;
   introducing a subsequent composition into the wellbore, wherein the subsequent composition displaces all but a remaining portion of the wellbore treating fluid from the wellbore; and
   setting the zeolite in the remaining portion of the wellbore treating fluid with a compressive-strength developing amount of at least one activator.

36. The method of claim 35 wherein the subsequent composition comprises the compressive-strength developing amount of the at least one activator.

37. The method of claim 36 wherein the subsequent composition comprises at least one of a mud, a spotting fluid, a pill and a cement slurry.

38. The method of claim 35 wherein the at least one activator is selected from the group consisting of calcium hydroxide, sodium silicate, sodium fluoride, sodium silicofluoride, magnesium silicofluoride, zinc silicofluoride, sodium carbonate, potassium carbonate, sodium hydroxide, potassium hydroxide, sodium sulfate, and mixtures thereof.

39. The method of claim 35 wherein the wellbore treating fluid further comprises the compressive-strength developing amount of the least one activator, and at least one retarder.

40. The method of claim 35 wherein the setting of the zeolite seals one or more of a fissure, fracture, cavern, vug, thief zone, low pressure subterranean zone, and high pressure subterranean zone in the wellbore.

41. The method of claim 35 wherein the zeolite is represented by the formula:

$$M_{a/n}[(AlO_2)_a(SiO_2)_b] \cdot xH_2O$$

where M represents one or more cations selected from the group consisting of Na, K, Mg, Ca, Sr, Li, Ba, $NH_4$, $CH_3NH_3$, $(CH_3)_3NH$, $(CH_3)_4N$, Ga, Ge and P; n represents the cation valence; the ratio of b:a is in a range from greater than or equal to 1 and less than or equal to 5; and x represents the moles of water entrained into the zeolite framework.

42. The method of claim 35 wherein the zeolite is selected from the group consisting of analcime, bikitaite, brewsterite, chabazite, clinoptilolite, faujasite, harmotome, heulandite, laumontite, mesolite, natrolite, paulingite, phillipsite, scolecite, stellerite, stilbite, and thomsonite.

* * * * *